(12) United States Patent
Kim et al.

(10) Patent No.: US 8,792,690 B2
(45) Date of Patent: Jul. 29, 2014

(54) ENHANCING QUALITY OF ULTRASOUND SPATIAL COMPOUND IMAGE BASED ON BEAM PROFILE IN ULTRASOUND SYSTEM

(75) Inventors: Jeong Sik Kim, Seoul (KR); Song Yi Han, Seoul (KR)

(73) Assignee: Samsung Medison Co., Ltd., Hongcheon-Gun, Gangwon-Do (KR)

( * ) Notice: Subject to any disclaimer, the term of this patent is extended or adjusted under 35 U.S.C. 154(b) by 72 days.

(21) Appl. No.: 13/290,668

(22) Filed: Nov. 7, 2011

(65) Prior Publication Data
US 2012/0114209 A1    May 10, 2012

(30) Foreign Application Priority Data
Nov. 10, 2010   (KR) .................. 10-2010-0111370

(51) Int. Cl.
| | | |
|---|---|---|
| *G06K 9/00* | (2006.01) | |
| *G01S 7/52* | (2006.01) | |
| *G06T 5/20* | (2006.01) | |
| *G06T 5/00* | (2006.01) | |
| *G01S 15/89* | (2006.01) | |

(52) U.S. Cl.
CPC ......... *G01S 7/52077* (2013.01); *G01S 15/8995* (2013.01); *G06T 5/20* (2013.01); *G06T 5/001* (2013.01); *G01S 7/52047* (2013.01)
USPC ........................................................ 382/128

(58) Field of Classification Search
None
See application file for complete search history.

(56) References Cited

U.S. PATENT DOCUMENTS

| | | | | |
|---|---|---|---|---|
| 4,525,858 A | * | 6/1985 | Cline et al. ............. | 382/154 |
| 5,339,282 A | * | 8/1994 | Kuhn et al. ............. | 367/7 |
| 5,768,413 A | * | 6/1998 | Levin et al. ............. | 382/173 |
| 5,859,891 A | * | 1/1999 | Hibbard ................. | 378/62 |
| 5,862,269 A | * | 1/1999 | Cohen et al. ........... | 382/304 |

(Continued)

FOREIGN PATENT DOCUMENTS

| | | | | |
|---|---|---|---|---|
| JP | 2000-237187 | | 9/2000 | |
| JP | 2003-190157 | | 7/2003 | |
| WO | WO2008001694 | * | 3/2008 | ............ A61B 5/00 |

OTHER PUBLICATIONS

Ronald Boellaard, PhD; Nanda C. Krak, Md; Otto S. Hoekstra, PhD; and Adriaan A. Lammertsma, PhD, "Effects of Noise, Image Resolution, and ROI Definition on the Accuracy of Standard Uptake Values: A Simulation Study", Nov. 24, 2003.*

(Continued)

*Primary Examiner* — Nirav G Patel
*Assistant Examiner* — Oneal R Mistry
(74) *Attorney, Agent, or Firm* — McDermott Will & Emery LLP

(57) ABSTRACT

There are provided embodiments for enhancing the quality of an ultrasound spatial compound image based on a beam profile in an ultrasound system. In one embodiment, an ultrasound system comprises: an ultrasound data acquisition unit configured to acquire ultrasound data for obtaining a plurality of ultrasound images corresponding to a plurality of steering angles; a storage unit for storing at least one beam profile indicating a spreading degree of an ultrasound beam according to depth based on at least one focusing point; and a processing unit configured to set an amount of blurring corresponding to spreading of the ultrasound beam according to the depth based on the at least one beam profile, and perform a filtering process for compensating the blurring by the spreading of the ultrasound beam based on the ultrasound data and the amount of blurring to form an ultrasound spatial compound image.

18 Claims, 9 Drawing Sheets

(56) References Cited

U.S. PATENT DOCUMENTS

| | | | |
|---|---|---|---|
| 6,122,042 A * | 9/2000 | Wunderman et al. | 356/73 |
| 6,249,594 B1 * | 6/2001 | Hibbard | 382/128 |
| 6,307,914 B1 * | 10/2001 | Kunieda et al. | 378/65 |
| 6,373,918 B1 * | 4/2002 | Wiemker et al. | 378/62 |
| 6,524,252 B1 * | 2/2003 | Yu et al. | 600/443 |
| 6,530,885 B1 * | 3/2003 | Entrekin et al. | 600/437 |
| 7,092,548 B2 * | 8/2006 | Laumeyer et al. | 382/104 |
| 7,139,067 B2 * | 11/2006 | Pohle et al. | 356/5.04 |
| 7,382,907 B2 * | 6/2008 | Luo et al. | 382/128 |
| 7,558,611 B2 * | 7/2009 | Arnold et al. | 600/407 |
| 7,632,229 B2 * | 12/2009 | Washburn et al. | 600/437 |
| 7,860,333 B2 * | 12/2010 | Zeng | 382/260 |
| 7,941,462 B2 * | 5/2011 | Akinyemi et al. | 707/803 |
| 8,126,231 B2 * | 2/2012 | Sakaida | 382/128 |
| 8,157,737 B2 * | 4/2012 | Zhang et al. | 600/443 |
| 8,221,322 B2 * | 7/2012 | Wang et al. | 600/437 |
| 2008/0146931 A1 * | 6/2008 | Zhang et al. | 600/447 |
| 2011/0054323 A1 * | 3/2011 | Ahn | 600/443 |

OTHER PUBLICATIONS

Michaelann S. Tartis 1, Dustin E. Kruse, Hairong Zheng, Hua Zhang, Azadeh Kheirolomoom, Jan Marik, Katherine W. Ferrara, "Dynamic microPET imaging of ultrasound contrast agents and lipid delivery", May 6, 2008.*

Paolo Zanotti-Fregonara, Renaud Maroy, Claude Comtat, Sebastient Jan, Veronique Gaura, Avner Bar-Hen, Maria-Joao Ribeiro, and Regine Trebossen; "Comparison of 3 Methods of Automated Internal Carotid Segmentation in Human Brain PET Studies: Application to the Estimation of Arterial Input Function" Feb. 17, 2009.*

Hong Guo, Rosemary Renaut, Kewei Chen, Eric Reiman, "Clustering huge data sets from parametric PET imaging"; 2003, Elsevier Ireland Ltd.*

Chu et al. "Supercompound Imaging with Weiner Deconvolution" Ultrasonic Imaging and Signal Processing, Proc. of SPIE vol. 7265, 2009.*

European Office Communication issued in European Patent Application No. 11 187 788.2 dated Jun. 28, 2013.

European Search Report issued in European Patent Application No. 11187788.2 dated Apr. 5, 2012.

Robinson, D.E., et al. "Lateral Deconvolution of Ultrasonic Beams". Utrasonic Imaging, Dynamedia Inc. vol. 6, No. 1, pp. 1-12. Jan. 1, 1984.

Taxt, T., et al. "Noise Robust Two-Dimensional Blind Deconvolution of Ultrasound Images". IEEE Ultrasonics Symposium. vol. 2, pp. 1465-1470. Oct. 5, 1997.

European Search Report issued in European Patent Application No. 11187788.2 dated Jul. 25, 2012.

Korean Office Action issued in Korean Patent Application No. 10-2010-0111370 dated Nov. 28, 2013, with English translation, 6 pgs.

* cited by examiner

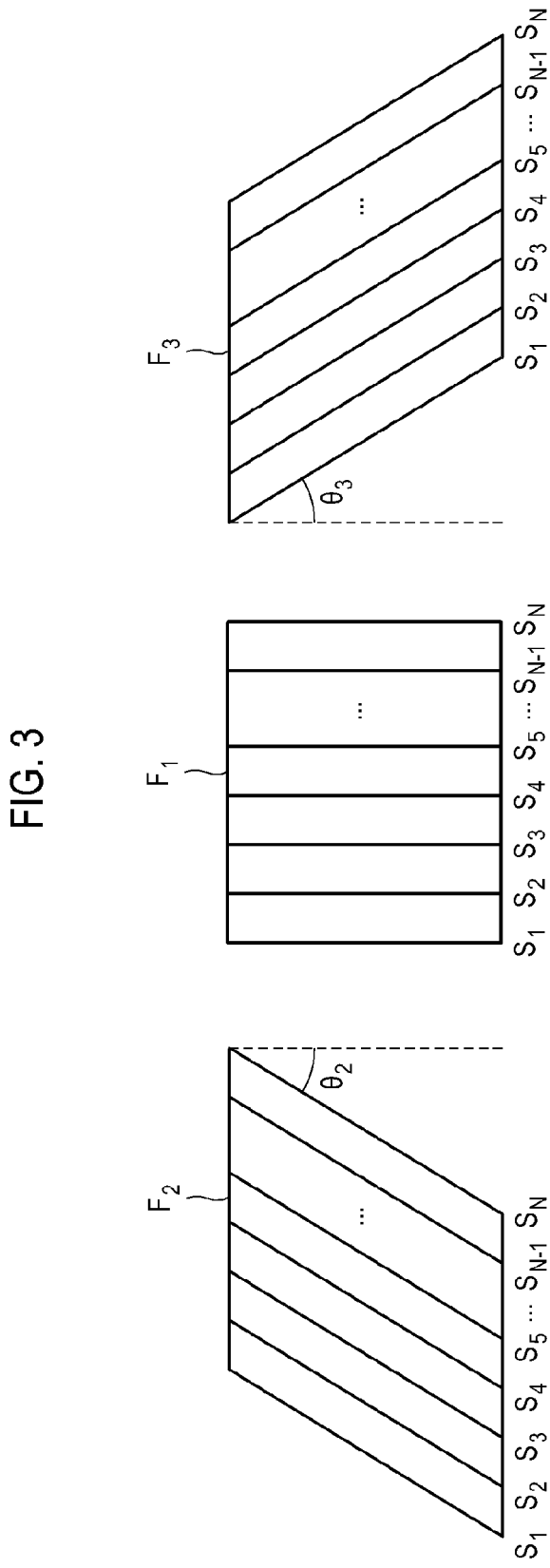

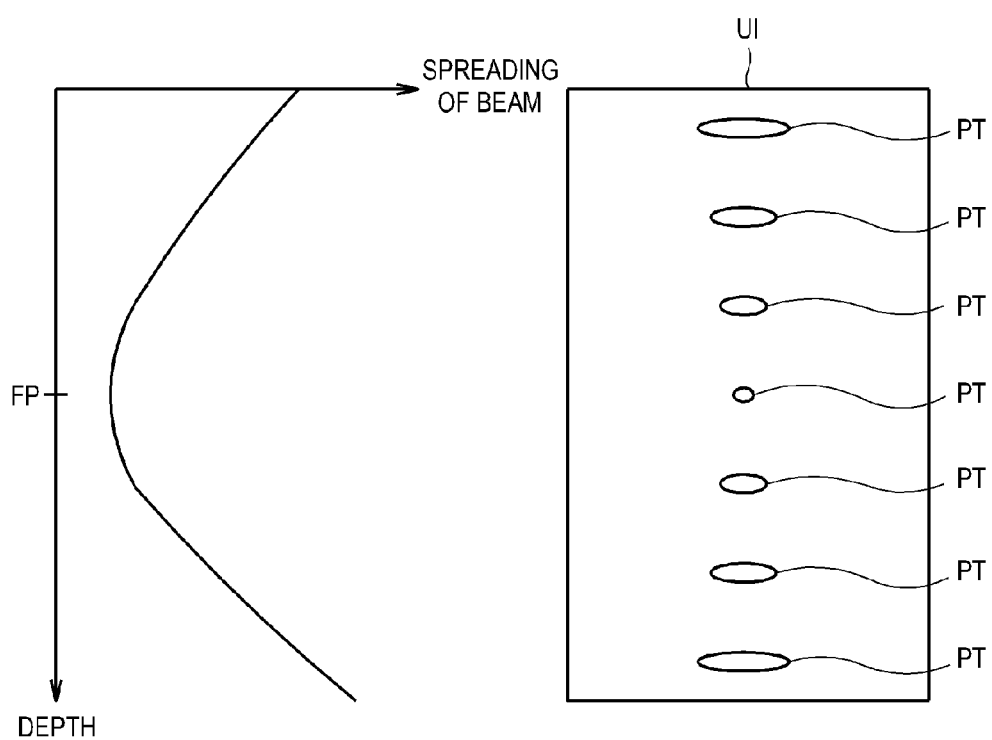

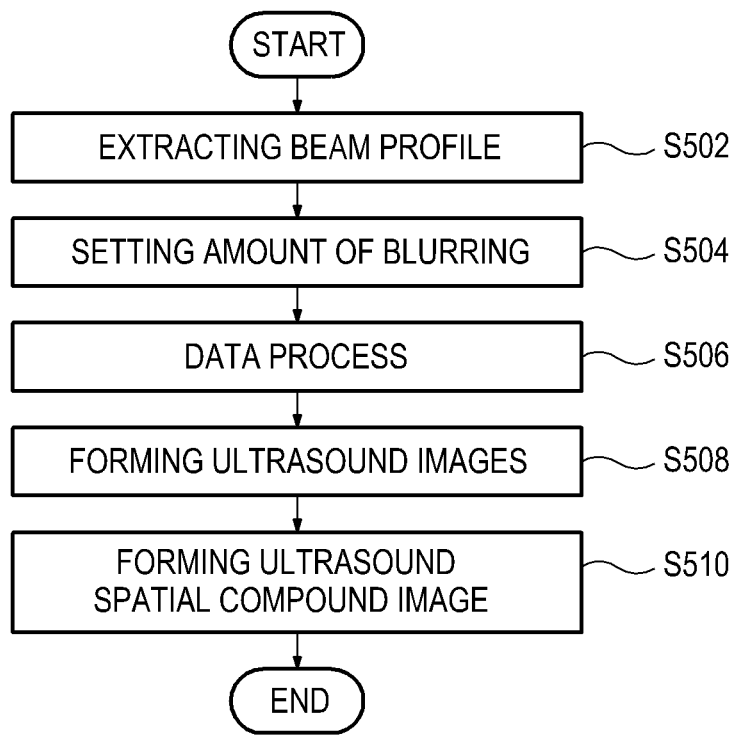

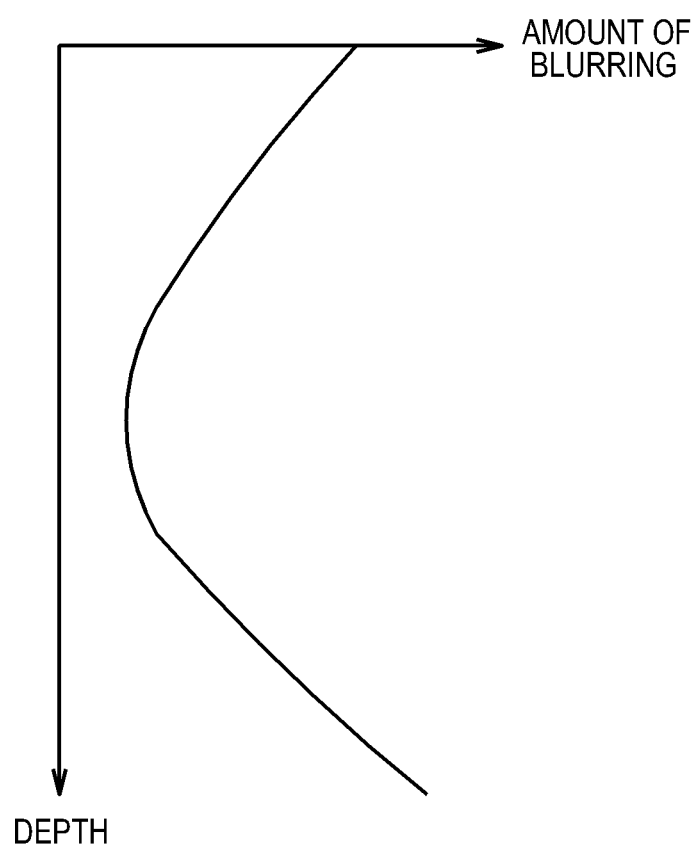

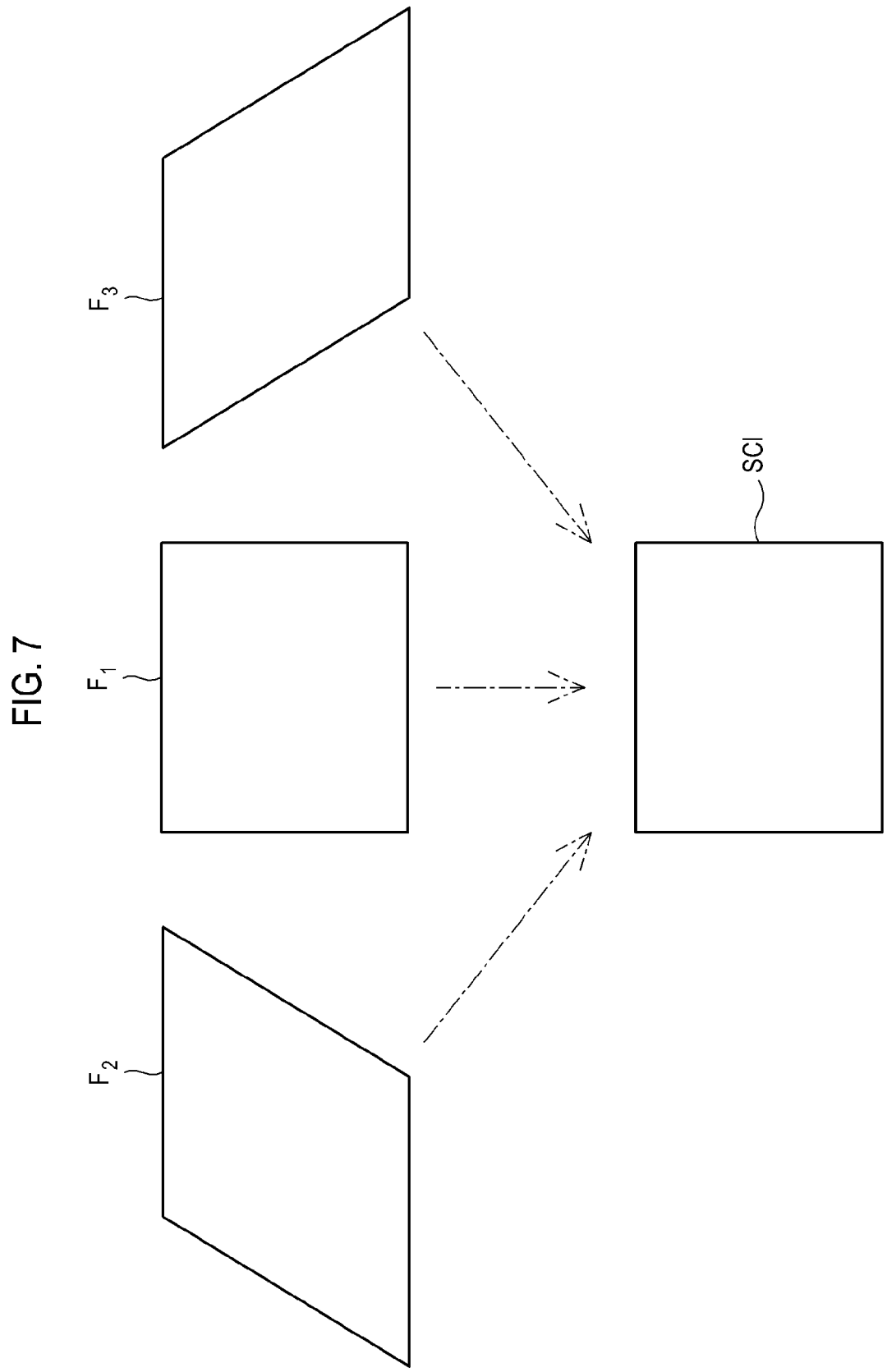

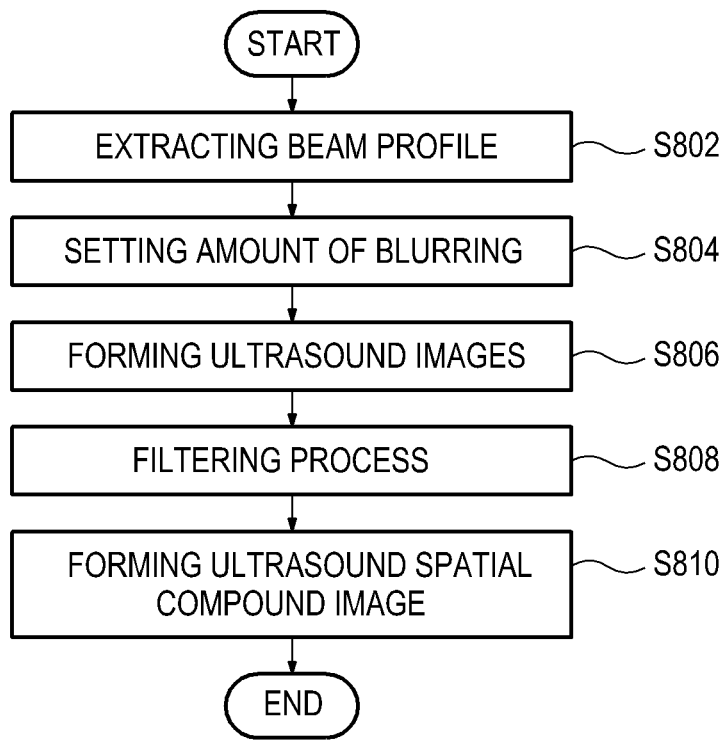

ENHANCING QUALITY OF ULTRASOUND SPATIAL COMPOUND IMAGE BASED ON BEAM PROFILE IN ULTRASOUND SYSTEM

CROSS-REFERENCE TO RELATED APPLICATIONS

The present application claims priority from Korean Patent Application No. 10-2010-0111370 filed on Nov. 10, 2010, the entire subject matter of which is incorporated herein by reference.

TECHNICAL FIELD

The present disclosure generally relates to ultrasound systems, and more particularly to enhancing quality of an ultrasound spatial compound image based on a beam profile in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two-dimensional or three-dimensional ultrasound images of internal features of a target object (e.g., human organs).

The ultrasound system may transmit ultrasound signals to a living body by using an ultrasound probe. The living body includes a target object (e.g., heart, fetus, etc.). The ultrasound signals from the ultrasound probe are transmitted as an ultrasound beam to the living body. The ultrasound system may further receive ultrasound signals (i.e., ultrasound echo signals) from the living body. The ultrasound system may also form an ultrasound image of the living body based on the received ultrasound echo signals. Various techniques have been studied to enhance resolution of the ultrasound image. Spatial compounding is known as one of such techniques.

The spatial compounding is an imaging technique that forms a compound image by combining ultrasound images. That is, the ultrasound system forms a plurality of ultrasound images and performs the spatial compounding upon the ultrasound images to form an ultrasound spatial compound image.

Generally, as the depth becomes shallower or deeper based on a focusing point FP, the spreading of the ultrasound beam becomes serious. An artifact that a size of point targets seems differently in the ultrasound spatial compound image even for an identical size of the point targets PT in the living body. That is, a blurring, which makes the ultrasound spatial compound image unclear, may occur. Accordingly, this presents a problem since the ultrasound spatial compound image corresponding to the original shape and size of the target object cannot be provided.

SUMMARY

There are provided embodiments for enhancing the quality of an ultrasound spatial compound image based on a beam profile in an ultrasound system.

In one embodiment, by way of non-limiting example, an ultrasound system comprises: an ultrasound data acquisition unit configured to acquire ultrasound data for obtaining a plurality of ultrasound images corresponding to a plurality of steering angles; a storage unit for storing at least one beam profile indicating a spreading degree of an ultrasound beam according to depth based on at least one focusing point; and a processing unit configured to set an amount of blurring corresponding to spreading of the ultrasound beam according to the depth based on the at least one beam profile, and perform a filtering process for compensating the blurring by the spreading of the ultrasound beam based on the ultrasound data and the amount of blurring to form an ultrasound spatial compound image.

In another embodiment, there is provided a method of enhancing the quality of an ultrasound spatial compound image, comprising: a) acquiring ultrasound data for obtaining a plurality of ultrasound images corresponding to a plurality of steering angles; b) setting an amount of blurring corresponding to spreading of the ultrasound beam by using at least one beam profile indicating a spreading degree of an ultrasound beam according to the depth based on at least one focusing point; and c) performing a filtering process for compensating the blurring by the spreading of the ultrasound beam based on the ultrasound data and the amount of blurring to form an ultrasound spatial compound image.

This summary is provided to introduce a selection of concepts in a simplified form that are further described below in the Detailed Description. This Summary is not intended to identify key or essential features of the claimed subject matter, nor is it intended to be used in determining the scope of the claimed subject matter.

BRIEF DESCRIPTION OF THE DRAWINGS

FIG. 3 is a schematic diagram showing an example of a plurality of ultrasound images corresponding to a plurality of steering angles.

FIG. 4 is a schematic diagram showing an example of a beam profile.

FIG. 5 is a flow chart showing a process of enhancing quality of an ultrasound spatial compound image based on the beam profile in accordance with a first embodiment.

FIG. 6 is a schematic diagram showing an example of the amount of blurring.

FIG. 7 is a schematic diagram showing an example of the ultrasound spatial compound image.

FIG. 8 is a flow chart showing a process of enhancing quality of an ultrasound spatial compound image based on the beam profile in accordance with a second embodiment.

FIG. 9 is a schematic diagram showing an example of a window.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
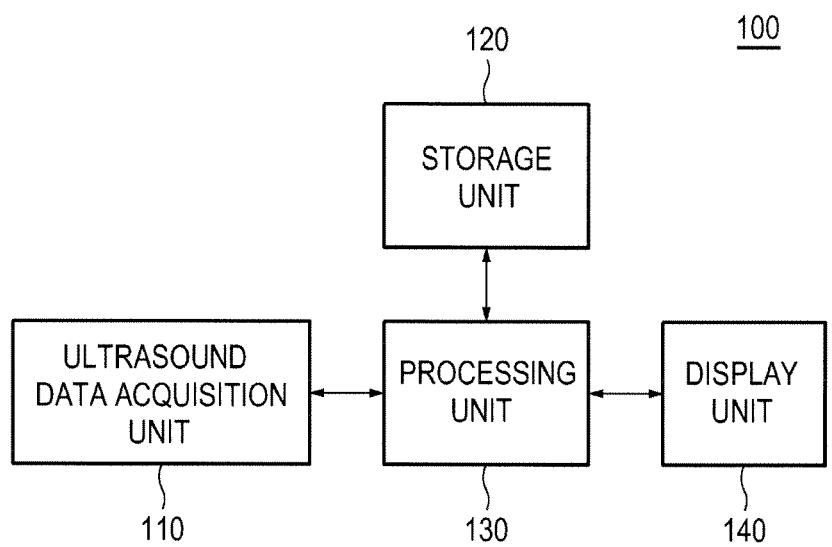
FIG. 1 is a block diagram showing an illustrative embodiment of an ultrasound system.

Referring to FIG. 1, an ultrasound system 100 in accordance with an illustrative embodiment is shown. As depicted therein, the ultrasound system 100 may include an ultrasound data acquisition unit 110.

The ultrasound data acquisition unit 110 may be configured to transmit ultrasound signals to a living body. The living body may include target objects (e.g., heart, fetus and the like). The ultrasound data acquisition unit 110 may be further configured to receive ultrasound signals (i.e., ultrasound echo signals) from the living body to acquire ultrasound data.

Figure 2:
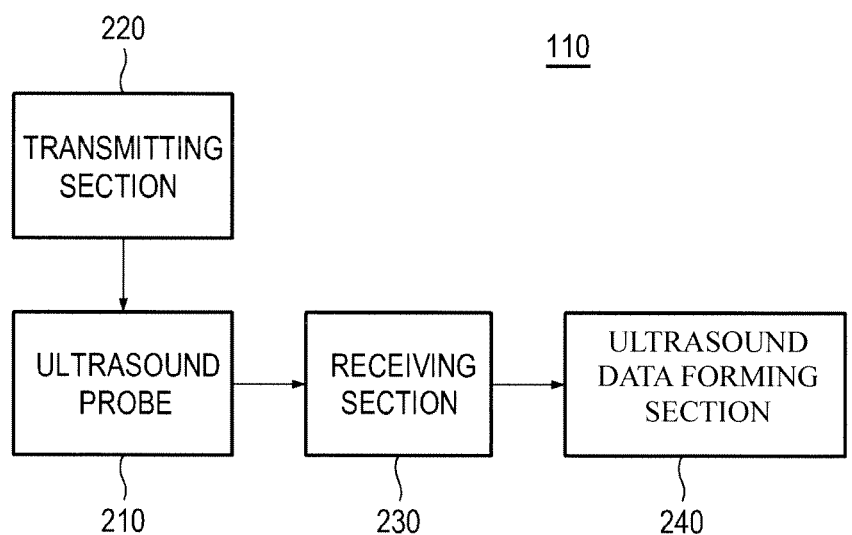
FIG. 2 is a block diagram showing an illustrative embodiment of an ultrasound data acquisition unit.

FIG. 2 is a block diagram showing an illustrative embodiment of the ultrasound data acquisition unit. Referring to FIG. 2, the ultrasound data acquisition unit 110 may include an ultrasound probe 210.

The ultrasound probe 210 may include a plurality of elements (not shown) for reciprocally converting between ultrasound signals and electrical signals. The ultrasound probe 210 may be configured to transmit ultrasound signals to the living body. The ultrasound probe 210 may be further configured to receive ultrasound echo signals from the living body to output received signals. The received signals may be analog signals. The ultrasound probe 210 may include a convex probe, a linear probe and the like.

The ultrasound data acquisition unit 110 may further include a transmitting section 220. The transmitting section 220 may be configured to control the transmission of the ultrasound signals. The transmitting section 220 may be further configured to generate electrical signals ("transmitting signals") for obtaining ultrasound images in consideration of the elements, focusing points and steering angles. Thus, the ultrasound probe 210 may be configured to convert the transmitting signals into the ultrasound signals, transmit the ultrasound signals to the living body and receive the ultrasound echo signals from the living body to thereby output the received signals. The ultrasound images may include a brightness mode image. However, it should be noted herein that the ultrasound images may not be limited thereto. The transmitting section 220 may include a transmitting signal generating section (not shown), a transmitting delay time information memory (not shown), a transmitting beam former (not shown) and the like.

In the embodiment, the transmitting section 220 may form first transmitting signals for obtaining a first ultrasound image $F_1$ corresponding to a first steering angle of scan-lines $S_i$ ($1 \leq i \leq N$), as shown in FIG. 3. Thus, the ultrasound probe 210 may convert the first transmitting signals into the ultrasound signals, transmit the ultrasound signals to the living body and receive the ultrasound echo signals from the living body to thereby output first received signals. The first steering angle may be 0°. However, it should be noted herein that the first steering angle may not be limited thereto. The transmitting section 220 may further form second transmitting signals for obtaining a second ultrasound image $F_2$ corresponding to a second steering angle $\theta_2$ of the scan-lines $S_i$ ($1 \leq i \leq N$), as shown in FIG. 3. Thus, the ultrasound probe 210 may convert the second transmitting signals into the ultrasound signals, transmit the ultrasound signals to the living body and receive the ultrasound echo signals from the living body to thereby output second received signals. The transmitting section 220 may further form third transmitting signals for obtaining a third ultrasound image $F_3$ corresponding to a third steering angle $\theta_3$ of the scan-lines $S_i$ ($1 \leq i \leq N$), as shown in FIG. 3. As such, the ultrasound probe 210 may convert the third transmitting signals into the ultrasound signals, transmit the ultrasound signals to the living body and receive the ultrasound echo signals from the living body to thereby output third received signals.

The ultrasound data acquisition unit 110 may further include a receiving section 230. The receiving section 230 may be configured to convert the received signals provided from the ultrasound probe 210 into digital signals. The receiving section 230 may be further configured to apply delays to the digital signals in consideration of the elements, the focusing points and the steering angles to thereby output digital receive-focused signals. The receiving section 230 may include an analog-to-digital converter (not shown), a receiving delay time information memory (not shown), a receiving beam former (not shown) and the like.

In the embodiment, the receiving section 230 may convert the first received signals provided from the ultrasound probe 210 into first digital signals. The receiving section 230 may further apply delays to the first digital signals in consideration of the elements, the focusing points and the first steering angle to thereby output first digital receive-focused signals. The receiving section 230 may further convert the second received signals provided from the ultrasound probe 210 into second digital signals. The receiving section 230 may further apply delays to the second digital signals in consideration of the elements, the focusing points and the second steering angle $\theta_2$ to thereby output second digital receive-focused signals. The receiving section 230 may further convert the third received signals provided from the ultrasound probe 210 into third digital signals. The receiving section 230 may further apply delays to the third digital signals in consideration of the elements, the focusing points and the third steering angle $\theta_3$ to thereby output third digital receive-focused signals.

The ultrasound data acquisition unit 110 may further include an ultrasound data forming section 240. The ultrasound data forming section 240 may be configured to form ultrasound data corresponding to the ultrasound images of the steering angles based on the digital receive-focused signals. The ultrasound data may include radio frequency data. However, it should be noted herein that the ultrasound data may not be limited thereto. The ultrasound data forming section 240 may be further configured to perform signal processing (e.g., gain control, etc) upon the digital receive-focused signals.

In the embodiment, the ultrasound data forming section 240 may form first ultrasound data corresponding to the first ultrasound image $F_1$ of the first steering angle based on the first digital receive-focused signals provided from the receiving section 230. The ultrasound data forming section 240 may further form second ultrasound data corresponding to the second ultrasound image $F_2$ of the second steering angle $\theta_2$ based on the second digital receive-focused signals provided from the receiving section 230. The ultrasound data forming section 240 may further form third ultrasound data corresponding to the third ultrasound image F3 of the third steering angle $\theta_3$ based on the third digital receive-focused signals provided from the receiving section 230.

Although it is described that the ultrasound data corresponding to the ultrasound images of the three steering angles are acquired, the steering angles are certainly not limited thereto.

Referring back to FIG. 1, the ultrasound system 100 may further include a storage unit 120. The storage unit 120 may store at least one beam profile corresponding to at least one focusing point. The beam profile may indicate a spreading degree of an ultrasound beam according to depth. In the embodiment, the storage unit 120 may store a plurality of beam profiles corresponding to a plurality of focusing points. For example, the storage unit 120 may store the beam profile indicating the spread degree of the ultrasound beam according to the depth based on a focusing point FP, as shown in FIG. 4. As the depth goes shallower or deeper based on the focusing point FP, the spreading of the ultrasound beam becomes serious. Thus, an artifact that a size of point targets appears differently in an ultrasound image even for an identical size of the point targets PT in the living body, as shown in FIG. 4. That is, a blurring which makes the ultrasound image unclear may occur.

Although it has been described that the storage unit 120 stores the beam profile, the storage unit 120 may further store an amount of blurring corresponding to the beam profile.

The ultrasound system 100 may further include a processing unit 130 in communication with the ultrasound data acquisition unit 110 and the storage unit 120. The processing unit 130 may be configured to set the amount of blurring corresponding to the spreading of the ultrasound beam according to the depth for the ultrasound image, based on the beam profile. The processing unit 130 may be further configured to perform a filtering process for compensating the blurring by the spreading of the ultrasound beam, based on the ultrasound data and the amount of blurring. The processing unit 130 may include a central processing unit, a microprocessor, a graphic processing unit and the like.

FIG. 5 is a flow chart showing a process of enhancing quality of an ultrasound spatial compound image based on the beam profile in accordance with a first embodiment. The processing unit 130 may be configured to retrieve the storage unit 120 to extract a beam profile corresponding to a focusing point, at step S502 in FIG. 5.

The processing unit 130 may be configured to set the amount of blurring corresponding to the spreading of the ultrasound beam according to the depth for the ultrasound images based on the extracted beam profile, at step S504 in FIG. 5.

In the embodiment, the processing unit 130 may set the amount of blurring corresponding to the spreading of the ultrasound beam according to the depth based on the focusing point for each of the ultrasound images $F_1$ to $F_3$ as shown in FIG. 6 based on the extracted beam profile. The amount of blurring may be equal to the beam profile (i.e., a spreading degree of the ultrasound beam). Since the first to third ultrasound images $F_1$ to $F_3$ are only differently in terms of steering angles of the scan-lines and are identical in terms of the beam profile, the amount of blurring corresponding to the first to third ultrasound images $F_1$ to $F_3$ are the same. Thus, the processing unit 130 may set a single amount of blurring for the first to third ultrasound images $F_1$ to $F_3$.

The processing unit 130 may be configured to perform a data process (i.e., filtering process) for compensating the blurring by the spreading of the ultrasound beam upon the ultrasound data provided from the ultrasound data acquisition unit 110, at step S506 in FIG. 5. The data process may include a blind deconversion, an inverse filtering and the like.

In the embodiment, the processing unit 130 may be configured to perform the data process for compensating the blurring by the spreading of the ultrasound beam upon each of the first to third ultrasound data provided from the ultrasound data acquisition unit 110.

The processing unit 130 may be configured to form the plurality of ultrasound images corresponding to the plurality of steering angles based on the data-processed ultrasound data, at step S508 in FIG. 5. The processing unit 130 may be configured to perform a spatial compound upon the plurality of ultrasound images to form the ultrasound spatial compound image, at step S510 in FIG. 5. The methods of forming the ultrasound spatial compound image are well known in the art. Thus, they have not been described in detail so as not to unnecessarily obscure the present invention.

In the embodiment, the processing unit 130 may form the first to third ultrasound images $F_1$ to $F_3$ as shown in FIG. 7 based on the data-processed first to third ultrasound data, respectively. The processing unit 130 may further perform the spatial compound upon the first to third ultrasound images $F_1$ to $F_3$ to form the ultrasound spatial compound image SCI.

FIG. 8 is a flow chart showing a process of enhancing quality of an ultrasound spatial compound image based on the beam profile in accordance with a second embodiment. The processing unit 130 may be configured to retrieve the storage unit 120 to extract a beam profile corresponding to a focusing point, at step S802 in FIG. 8.

The processing unit 130 may be configured to set the amount of blurring corresponding to the spread of the ultrasound beam according to the depths for the ultrasound images based on the extracted beam profile, at step S804 in FIG. 8. The methods of setting the amount of blurring in the second embodiment are similar to the methods of setting the amount of blurring in the first embodiment. Thus, they have not been described in detail.

The processing unit 130 may be configured to form the plurality of ultrasound images corresponding to the plurality of steering angles based on the ultrasound data provided from the ultrasound data acquisition unit 110. In the embodiment, the processing unit 130 may form the first to third ultrasound images $F_1$ to $F_3$ based on the first to third ultrasound data provided from the ultrasound data acquisition unit 110, as shown in FIG. 7.

The processing unit 130 may be configured to perform the filtering process for compensating the blurring by the spreading of the ultrasound beam upon each of the ultrasound images, at step S808 in FIG. 8.

Figure 10:
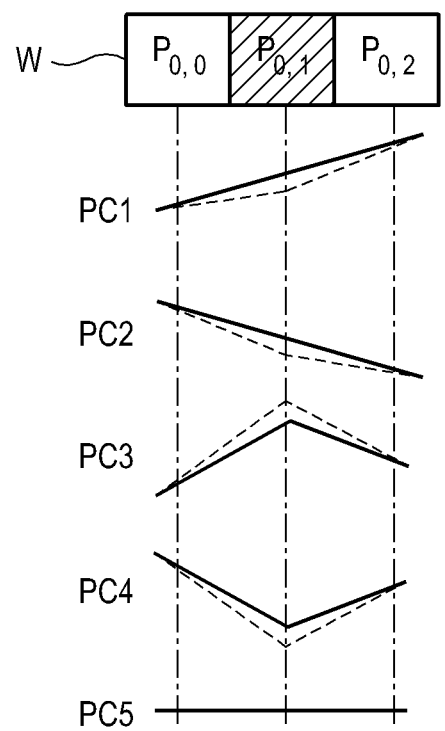
FIG. 10 is a schematic diagram showing a change of pixel values.

In the embodiment, the processing unit 130 may set a window W based on a pixel $P_{0,1}$ of the first ultrasound image $F_1$, as shown in FIG. 9. The window W may have a predetermined size. For example, the window W may have a size of 1×3. The processing unit 130 may further detect pixel values (i.e., brightness values) of pixels $P_{0,0}$, $P_{0,1}$ and $P_{0,2}$ corresponding to the window W. The processing unit 130 may further compare the pixel values to detect a change of the pixel values of the pixels corresponding to the window W. If it is determined that the pixel values increase (solid line of PC1) or decrease (solid line of PC2) as shown in FIG. 10, the processing unit 130 may perform the filtering process (dotted line of PC1 or PC2) for decreasing the pixel value of the pixel $P_{0,1}$, based on the amount of blurring corresponding to the depth of the pixel $P_{0,1}$. Else, if it is determined that the pixel value of the pixel $P_{0,1}$ located on the center of the pixels $P_{0,0}$, $P_{0,1}$ and $P_{0,2}$ corresponding to the window W is a maximum value (solid line of PC3) as shown in FIG. 10, the processing unit 130 may perform the filtering process (dotted line of PC3) for increasing the pixel value of the pixel $P_{0,1}$, based on the amount of blurring corresponding to the depth of the pixel $P_{0,1}$. Else, if it is determined that the pixel value of the pixel $P_{0,1}$ located on the center of the pixels $P_{0,0}$, $P_{0,1}$ and $P_{0,2}$ corresponding to the window W is a minimum value (solid line of PC4) as shown in FIG. 10, the processing unit 130 may perform the filtering process(dotted line of PC4) for decreasing the pixel value of the pixel $P_{0,1}$, based on the amount of blurring corresponding to the depth of the pixel $P_{0,1}$. Else, if it is determined that the change of the pixel values is zero (PC5), that is, the pixel values of the pixels $P_{0,0}$, $P_{0,1}$ and $P_{0,2}$ corresponding to the window W are equal to one another as shown in FIG. 10, the processing unit 130 may not perform the filtering process upon the pixel $P_{0,1}$. The processing unit 130 may perform the above-described filtering process upon all pixels of the first to third ultrasound images $F_1$ to $F_3$, while shifting the window W by one pixel.

The processing unit 130 may be configured to perform the spatial compound upon the filtering-processed ultrasound images to form the ultrasound spatial compound image, at step S510 in FIG. 5.

Figure 11:
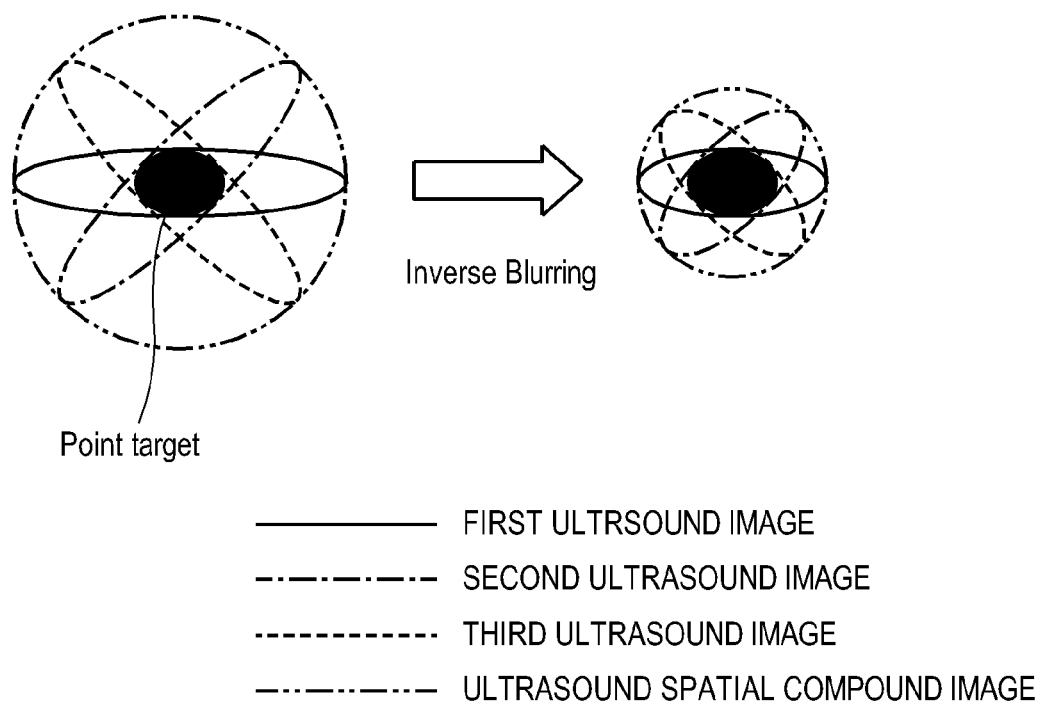
FIG. 11 is a schematic diagram showing an example of enhancing quality of the ultrasound spatial compound image by an inverse blurring process.

The size of the point target in the ultrasound spatial compound image is similar to the size of the target point, as performing the spatial compound upon the inverse blurring-processed ultrasound images to form the ultrasound spatial compound image, as shown in FIG. 11. Thus, the quality of the ultrasound spatial compound image may be enhanced.

Referring back to FIG. 1, the ultrasound system 100 may further include a display unit 140. The display unit 140 may be configured to display the ultrasound spatial compound image formed by the processing unit 130. The display unit 140 may be further configured to display the plurality of ultrasound images formed by the processing unit 130.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
an ultrasound data acquisition unit configured to acquire ultrasound data for obtaining a plurality of ultrasound images corresponding to a plurality of steering angles;
a storage for storing at least one beam profile indicating a spreading degree of an ultrasound beam according to depth based on at least one focusing point; and
a processor configured to set an amount of blurring corresponding to spreading of the ultrasound beam according to the depth based on the at least one beam profile, the processor being further configured to remove the blurring from the plurality of ultrasound images based on the amount of blurring and to form an ultrasound spatial compound image by compounding the plurality of ultrasound images from which the blurring was removed,
wherein the processor removes the blurring from respective ultrasound images based on the amount of blurring and a change of pixel values of respective pixels included in respective ultrasound images.

2. The ultrasound system of Claim 1, wherein the amount of blurring is equal to the beam profile.

3. The ultrasound system of claim 1, wherein the processor is configured to:
perform the filtering process upon the ultrasound data based on the amount of blurring;
form the plurality of ultrasound images based on the filtering-processed ultrasound data; and
perform a spatial compound upon the plurality of ultrasound images to form the ultrasound spatial compound image.

4. The ultrasound system of claim 3, wherein the filtering process comprises a blind deconversion or an inverse filtering.

5. The ultrasound system of claim 1, wherein the processor is configured to:
form the plurality of ultrasound images based on the ultrasound data;
perform the filtering process upon each of the ultrasound images based on the amount of blurring; and
perform a spatial compound upon the filtering-processed ultrasound images to form the ultrasound spatial compound image.

6. The ultrasound system of claim 5, wherein the processing unit is configured to:
set a window having a predetermined size based on pixels including each of the ultrasound images;
detect pixel values of pixels corresponding to the window;
compare the pixel values to detect a change of the pixel values of the pixels corresponding to the window; and
perform the filtering process upon each of the pixels based on the change of the pixel values and the amount of blurring.

7. The ultrasound system of claim 6, wherein if it is determined that the pixel values increase or decrease, the processor is configured to perform the filtering process for decreasing the pixel values of the pixels based on the amount of blurring corresponding to the depth of each of the pixels.

8. The ultrasound system of claim 6, wherein if it is determined that the pixel value of the pixel located on the center of the window is a maximum value, the processor is configured to perform the filtering process for increasing the pixel value of the pixel corresponding to the maximum value based on the amount of blurring corresponding to the depth of the pixel corresponding to the maximum value.

9. The ultrasound system of claim 6, wherein if it is determined that the pixel value of the pixel located on the center of the window is a minimum value, the processor is configured to perform the filtering process for decreasing the pixel value of the pixel corresponding to the minimum value based on an amount of blurring corresponding to the depth of the pixel corresponding to the minimum value.

10. A method of enhancing a quality of an ultrasound spatial compound image, comprising:
a) acquiring ultrasound data for obtaining a plurality of ultrasound images corresponding to a plurality of steering angles;
b) setting an amount of blurring corresponding to spreading of the ultrasound beam by using at least one beam profile indicating a spreading degree of an ultrasound beam according to the depth based on at least one focusing point;
c) removing the blurring from the plurality of ultrasound images based on the amount of blurring; and
d) forming an ultrasound spatial compound image by compounding the plurality of ultrasound images from which the blurring was removed,
wherein the removal of the blurring comprises removal of the blurring from respective ultrasound images based on the amount of blurring and a change of pixel values of respective pixels included in respective ultrasound images.

11. The method of claim 10, wherein the amount of the blurring is equal to the beam profile.

12. The method of claim 10, wherein the step c) comprises:
performing the filtering process upon the ultrasound data based on the amount of blurring;
forming the plurality of ultrasound images based on the filtering-processed ultrasound data; and
performing a spatial compound upon the plurality of ultrasound images to form the ultrasound spatial compound image.

13. The method of claim 12, wherein the filtering process comprises a blind deconversion or an inverse filtering.

14. The method of claim 10, wherein the step c) comprises:

c1) forming the plurality of ultrasound images based on the ultrasound data; and c2) performing the filtering process upon each of the ultrasound images based on the amount of blurring, wherein the step d) comprises performing the spatial compound upon the filtering-processed ultrasound images to form the ultrasound spatial compound image.

15. The method of claim 14, wherein the step c2) comprises:

c21) setting a window having a predetermined size based on pixels including each of the ultrasound images;

c22) detecting pixel values of pixels corresponding to the window;

c23) comparing the pixel values to detect a change of the pixel values of the pixels corresponding to the window; and c24) performing the filtering process upon each of the pixels based on the change of the pixel values and the amount of blurring.

16. The method of claim 15, wherein the step c24) comprises:

if it is determined that the pixel values increase or decrease, performing the filtering process for decreasing the pixel values of the pixels based on the amount of blurring corresponding to the depth of each of the pixels.

17. The method of claim 15, wherein the step c24) comprises:

if it is determined that the pixel value of the pixel located on the center of the window is a maximum value, performing the filtering process for increasing the pixel value of the pixel corresponding to the maximum value based on the amount of blurring corresponding to the depth of the pixel corresponding to the maximum value.

18. The method of claim 15, wherein the step c24) comprises:

if it is determined that the pixel value of the pixel located on the center of the window is a minimum value, performing the filtering process for decreasing the pixel value of the pixel corresponding to the minimum value based on an amount of blurring corresponding to the depth of the pixel corresponding to the minimum value.

* * * * *